Figure 1:
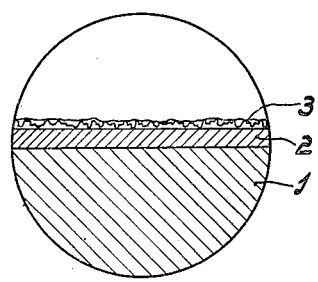

Patented Feb. 2, 1943

2,310,002

UNITED STATES PATENT OFFICE 2,310,002

METHOD OF MAKING BLOCKING LAYER ELECTRODE SYSTEMS

Willem Christiaan van Geel, Hendrik Emmens, and Ludovicus Augustinus Lambertus Esseling, Eindhoven, Netherlands, assignors, by mesne assignments, to Hartford National Bank and Trust Company, Hartford, Conn., as trustee Application May 28, 1938, Serial No. 210,796
In Germany June 24, 1937

8 Claims. (Cl. 117—29)

Our invention relates to a method of making a blocking layer electrode system.

It is frequently desirable, for example in producing the fluorescent screens in cathode-ray tubes, to apply a powdery substance to a metallic carrier or substratum to form a continuous coating. In the past this could be effected only by a very complicated process, and in many cases the coating became loosened from the carrier. In metal oxide rectifiers, it has been proposed to apply a graphite layer to the metal oxide by rubbing graphite into the irregular surface of the oxide layer; a conductor being secured to the graphite layer. Obviously this does not solve the problems of the present invention because the graphite layer is not firmly secured to the substratum.

It has also been proposed to apply a pulverulent layer of a semi-conductive substance to a carrier, for example in connection with blocking layer rectifiers and photo-electric cells, by pressing a powder on a carrier to form a compact body. Such a method, however, has the disadvantages that the pulverulent layer is quite likely to become detached from the carrier, and must be rather thick as otherwise it will not be continuous.

The object of the present invention is to eliminate the above difficulties and to provide a method by which pulverulent material can be applied to a carrier, so as to form a coating which is continuous, is firmly secured to the carrier, and may be relatively thin.

In accordance with the invention we first apply to a metallic carrier, a thin intermediate layer of a metallic substance whose melting point is lower than that of the pulverulent substance and the carrier material, apply the pulverulent layer, and heat the composite body to a temperature which is above the melting point of the metal intermediate layer, but below the melting points of the pulverulent substance and the carrier material.

We have found that the method according to the invention insures satisfactory mechanical adhesion between the pulverulent layer and the carrier, while at the same time the pulverulent layer does not lose its properties. Thus, for example, it is possible to prevent the particles of the pulverulent material from sintering together or melting in the form of a uniform layer which is particularly injurious when a surface of granular structure is desired.

If the electric contact between the pulverulent layer and the carrier must meet certain requirements, the method has to be carried out in a preferred embodiment by selecting such substances and such temperatures that chemical reactions do not take place between the carrier, the metal intermediate layer, and the pulverulent layer. By properly selecting the materials, we obtain not only a satisfactory mechanical connection, but also an advantageous electric connection between the pulverulent layer and the solid carrier. If a good electric contact is desired, the pulverulent layer may be made of a metal. However, the method according to the invention is also applicable for producing coating of non-metallic conductive pulverulent substances, such as carbon and graphite.

The method of the invention, which can be used in many fields of industry, makes it possible to provide a pulverulent layer of particularly small thickness, for instance of several microns, on a carrier, while at the same time obtaining a firm adherence.

Figure 2:
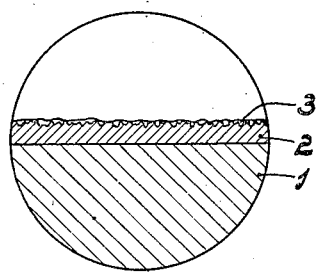
Figure 3:
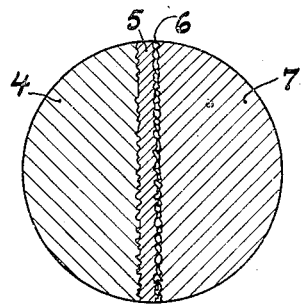

In order that the invention may be clearly understood and readily carried into effect, we shall describe the same in more detail in connection with several specific examples, and with reference to the accompanying drawing, in which:

Figures 1 and 2 are greatly enlarged sectional views of a portion of an anode of a transmitting tube, and Fig. 3 is a greatly enlarged sectional view of a portion of an electrode system embodying the invention.

To decrease the secondary emission of the anodes of transmission tubes, these anodes, which are generally of tungsten or molybdenum, are coated with a substance of low electron emissivity, such as zirconium oxide powder.

As shown in Figure 1, the main body of such an anode is indicated by reference numeral 1, and as stated, may be of tungsten or molybdenum. In accordance with the invention, we first coat the main body 1 electrolytically with a thin layer 2, for instance 5 to 10 microns thick, of a material which has a lower melting point than that of the main body or the pulverulent material, for example nickel, chromium, cobalt. The pulverulent material, for example zirconium oxide ($ZrO_2$), is then applied by precipitation from a solution to form a layer 3.

The composite body of Fig. 1 is then heated at a temperature above the melting point of layer 2; if layer 2 is of nickel the heating is effected at a temperature of about 1800° C. When intermediate layer 2 is in its molten state the $ZrO_2$ particles of layer 3 sink partly into layer 2 to produce the structure shown in Fig. 2. As the ZrO₂ particles are partly embedded in layer 2, they are firmly secured thereto as well as to the main body.

As stated, the invention can be used for many purposes, several of which are set forth in the following examples:

Example 1

This example relates to the construction of cathode-ray tubes in which a fluorescent powder is applied to a metal layer to form a screen. In this case a substratum or carrier of tungsten or molybdenum is coated with a silver film by electro-deposition. A fluorescent powder, which may be formed of zinc sulphide (ZnS) or zinc silicate (ZnSiO4) is then applied to the free surface of the silver layer by spraying or by electrophoresis. The resulting composite body is then heated at a temperature above the melting point of silver, for instance at about 1050° C., whereby the silver melts and a good mechanical connection is obtained between the fluorescent powder and the metal carrier.

Example 2

As mentioned above, transmission tubes, as well as other radio tubes, should be provided with an electrode having a low secondary emission. In addition, in many cases it is desirable that the heat be radiated from an electrode in a satisfactory manner. For this purpose, an anode made of iron is first coated with a thin copper layer, after which black molybdenum or tungsten powder is applied to the copper. The body so obtained is heated at a temperature above the melting point of copper, whereby a good adhesion between the iron of the carrier and the black molybdenum or tungsten is obtained. The resulting surface is of high heat-radiating capacity.

Example 3

To avoid a counter emission and consequential back ignition in gas discharge tubes, it is desirable to use for the anodes or control electrodes, a substance having a low electron emission, such as carbon. In come cases the anode comprises a core of metal, and only an external layer of carbon is used for the above purpose. In accordance with the invention, such an electrode may be made by using molybdenum as the core matreial, applying a nickel layer thereto, and then applying a layer of carbon powder. By heating at a temperature above the melting point of the nickel, the carbon particles are partly embedded in the nickel layer.

Example 4

The method according to the invention is also useful for making electrode systems having unsymmetrical conductivity, such as rectifiers for low or high frequencies (detectors) or photoelectric cells, and particularly for systems having a selenium electrode which is applied to a carrier provided with a carbon coating.

In accordance with the invention, and as shown in Fig. 3, such a system is built up in the following manner: To obtain more satisfactory adhesion, a solid carrier 4 of aluminum is provided with an irregular or roughened surface, for example by chemical action with hydrochloric acid. A solid carrier is necessary to give the selenium the required mechanical rigidity and to provide for the supply of current thereto.

A cadmium or zinc film 5 having a thickness of a few microns is applied to this roughened surface by electrolysis or by vaporization, and the free surface of the layer 5 is rubbed with dry pulverulent carbon. Alternatively, the carbon may be applied by means of a suspension in water, the suspension agent being then removed by vaporization. The aggregate is then heated to a temperature of about 500° C., so that the cadmium or zinc becomes liquid and the carbon particles 6 become partly embedded in the layer 5.

Subsequently a selenium layer 7 is applied to the carbon layer and readily adheres thereto. For this purpose the selenium is applied in a liquid state and then spread and rolled to a thickness of about 0.1 mm. If unsymmetrical conductivity is desired, a blocking layer (not shown) for example of polystyrene, is applied to the selenium after it has tempered, i. e., transformed into the crystalline modification, and a good conducting electrode (for example of Wood's metal) is applied to the blocking layer. Substances such as halides may be added to the selenium to reduce its resistivity.

Although we have described our invention by means of specific examples and in connection with specific applications, we do not wish to be limited thereto, but desire the appended claims to be construed as broadly as permissible in view of the prior art.

What we claim is:

1. In the manufacture of a blocking layer electrode system having a carrier of a metallic material, the steps of applying to a surface of the carrier a metallic substance having a melting point below that of the metallic material to form a thin intermediate layer thereon, forming upon the free surface of the intermediate layer a continuous layer of a pulverulent material having a melting point above that of the metallic substance, and heating the composite body at a temperature above the melting point of the metallic substance and below the melting points of the pulverulent material and the metallic material.

2. In the manufacture of a blocking layer electrode system having a carrier of a metallic material, the steps of applying to a surface of the carrier a metallic substance having a melting point below that of the metallic material to form a thin intermediate layer thereon, forming upon the free surface of the intermediate layer a continuous layer of a pulverulent material having a melting point above that of the metallic substance, and heating the composite body at a temperature which is between the melting point of the metallic substance and the melting points of the pulverulent material and the metallic material and at which there is no chemical reaction between the materials used.

3. In the manufacture of a blocking layer electrode system having a carrier of a metallic material, the steps of applying to a surface of the carrier a metallic substance having a melting point below that of the metallic material to form a thin intermediate layer thereon, forming upon the free surface of the intermediate layer a continuous layer of a metal powder having a melting point above that of the metallic substance, and heating the composite body at a temperature above the melting point of the metallic substance and below the melting points of the metal powder and the metallic material.

4. In the manufacture of a blocking layer electrode system having a carrier of a metallic material, the steps of applying to a surface of the carrier a metallic substance having a melting point below that of the metallic material to form a thin intermediate layer thereon, forming upon the free surface of the intermediate layer a continuous layer of a carbonaceous powder having a melting point above that of the metallic substance, and heating the composite body at a temperature above the melting point of the metallic substance and below the melting points of the carbonaceous powder and the metallic material.

5. In the manufacture of a blocking layer electrode system having a carrier of a metallic material, the steps of applying to a surface of the carrier a metallic substance having a melting point below that of the metallic material to form a thin intermediate layer thereon, forming upon the free surface of the intermediate layer a continuous layer of a pulverulent semi-conductive material having a melting point above that of the metallic substance, and heating the composite body at a temperature above the melting point of the metallic substance and below the melting points of the semi-conductive material and the metallic material.

6. In the manufacture of a blocking layer electrode system having a carrier of a metallic material, the steps of applying cadmium to a surface of the carrier to form a thin intermediate layer thereon, forming upon the free surface of the intermediate layer a continuous layer of a pulverulent material having a melting point above that of the cadmium layer, and heating the composite body at a temperature above the melting point of the cadmium layer and below the melting points of the pulverulent material and the metallic material.

7. In the manufacture of a blocking layer electrode system having a carrier of a metallic material, the steps of applying zinc to a surface of the carrier to form a thin intermediate layer thereon, forming upon the free surface of the zinc layer a continuous layer of a pulverulent material having a melting point above that of the zinc layer, and heating the composite body at a temperature above the melting point of the zinc layer and below the melting points of the pulverulent material and the metallic material.

8. In the manufacture of a blocking layer electrode system having a carrier of a metallic material, the steps of applying one of the metals zinc and cadmium to a surface of the carrier to form a thin intermediate layer thereon, forming on the free surface of the intermediate layer a continuous layer of a carbonaceous pulverulent material having a melting point above that of the material of the intermediate layer, heating the composite body at a temperature above the melting point of the material of the intermediate layer and below the melting points of the carbonaceous material and the metallic material, and forming a layer of selenium upon the layer of carbonaceous material.

WILLEM CHRISTIAAN VAN GEEL.
HENDRIK EMMENS.
LUDOVICUS AUGUSTINUS
       LAMBERTUS ESSELING.